United States Patent
Li et al.

(10) Patent No.: US 8,679,434 B1
(45) Date of Patent: Mar. 25, 2014

(54) CATALYTIC ARTICLES, SYSTEMS AND METHODS FOR THE OXIDATION OF NITRIC OXIDE

(71) Applicant: BASF Corporation, Florham Park, NJ (US)

(72) Inventors: Yuejin Li, Edison, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/751,864

(22) Filed: Jan. 28, 2013

(51) Int. Cl.
    *B01D 53/94* (2006.01)
    *B01J 23/42* (2006.01)
    *B01J 23/44* (2006.01)
    *F01N 3/28* (2006.01)

(52) U.S. Cl.
    USPC ............ 423/213.5; 502/339; 60/274; 60/299; 60/301

(58) Field of Classification Search
    USPC ........... 423/213.5; 502/339; 60/274, 299, 301
    See application file for complete search history.

(56) References Cited

U.S. PATENT DOCUMENTS

2012/0263633 A1 * 10/2012 Koplin et al. .............. 423/213.5

OTHER PUBLICATIONS

Boll, Willi et al., "Loading and Aging Effects in Exhaust Gas After-Treatment Catalysts with Pt As Active Component", *Ind. Eng. Chem. Res. 49* 2010, 10303-10310.

Murrell, L. L. et al., "Sols as Precursors to Transitional Aluminas and These Aluminas as Host Supports for $CeO_2$ and $ZrO_2$ Micro Domains", *Catalysis and Automotoive Pollution Control II* 1991, 547-555.

* cited by examiner

*Primary Examiner* — Timothy Vanoy
(74) *Attorney, Agent, or Firm* — Melanie L. Brown

(57) ABSTRACT

Described is a catalytic article for the treatment of lean burn engine exhaust gas. The catalytic article comprises a honeycomb substrate having disposed thereon a washcoat containing one or more calcined platinum group metal components dispersed on a refractory metal oxide support located on the honeycomb substrate, the platinum group metal components having an average crystallite size in the range of about 10 to about 25 nm to provide a stable ratio of $NO_2$ to $NO_x$ when the exhaust gas flows through the honeycomb substrate. Methods of treating exhaust gas from a lean burn engine and a system for the removal of pollutants from a lean burn engine exhaust gas stream containing NOx are also described.

29 Claims, 1 Drawing Sheet

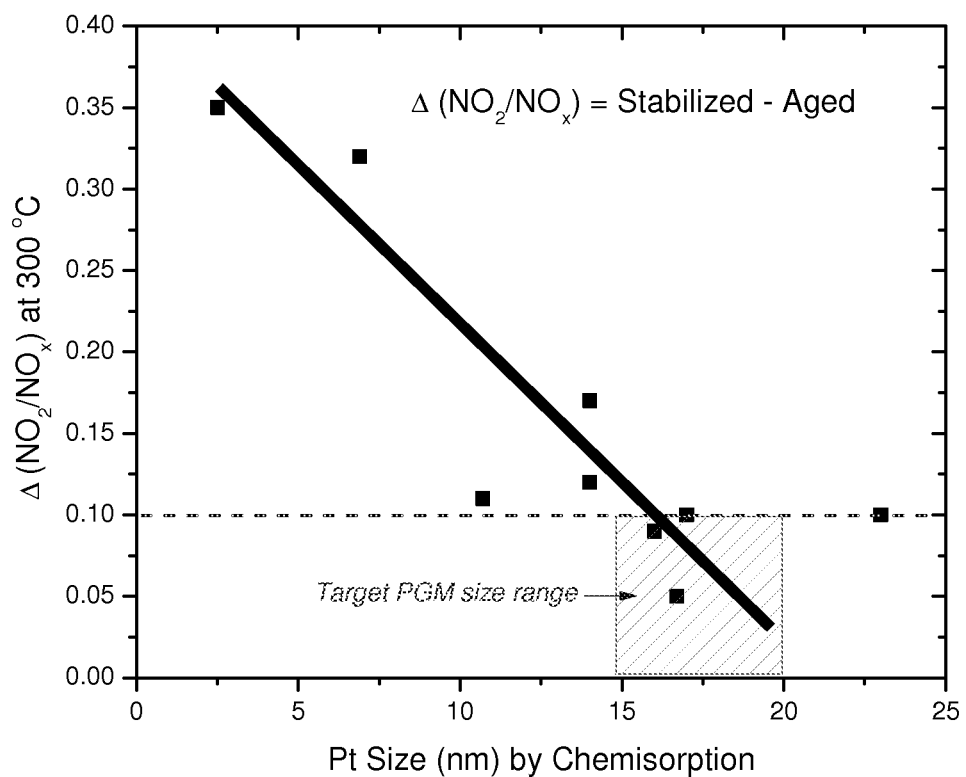

CATALYTIC ARTICLES, SYSTEMS AND METHODS FOR THE OXIDATION OF NITRIC OXIDE

TECHNICAL FIELD

The present invention relates to a catalyzed honeycomb substrate for the treatment of lean burn engine exhaust. More specifically, embodiments of the present invention are directed to catalytic articles comprising a platinum group metal supported on a refractory metal oxide support, where the average crystallite size of the platinum group metal is in the range of about 10 to about 25 nm.

BACKGROUND

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines present problems more severe than their spark-ignition counterparts. Because diesel engine exhaust gas is a heterogenous mixture, emission problems relate to particulate matter (PM), nitrogen oxides (NOx), unburned hydrocarbons (HC), and carbon monoxide (CO).

$NO_x$ is a term used to describe various chemical species of nitrogen oxides, including nitrogen monoxide (NO) and nitrogen dioxide ($NO_2$), among others. NO is of concern because it is believed to undergo a process known as photochemical smog formation, through a series of reactions in the presence of sunlight and hydrocarbons, and is a significant contributor to acid rain. $NO_2$, on the other hand, has a high potential as an oxidant and is a strong lung irritant.

Effective abatement of $NO_x$ from lean burn engines is difficult to achieve because high NOx conversion rates typically require reductant-rich conditions. Conversion of the $NO_x$ component of exhaust streams to innocuous components generally requires specialized $NO_x$ abatement strategies for operation under fuel lean conditions.

One such strategy for the abatement of $NO_x$ in the exhaust stream from lean burn engines uses $NO_x$ storage reduction (NSR) catalysts, which are also known as "lean $NO_x$ trap (LNT)." The lean $NO_x$ trap technology can involve the catalytic oxidation of NO to $NO_2$ by catalytic metal components effective for such oxidation, such as precious metals. However, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under fuel-rich combustion conditions that effect a reduction of the released $NO_x$ (nitrate) to $N_2$.

Oxidation catalysts comprising a precious metal dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from a diesel-powered engine to treat the exhaust before it vents to the atmosphere. Typically, the diesel oxidation catalysts are formed on ceramic or metallic substrate carriers (such as, e.g. a flow-through monolith carrier), upon which one or more catalyst coating compositions are deposited. In addition to the conversions of gaseous HC, CO, and the soluble organic fraction (SOF) of particulate matter, oxidation catalysts that contain platinum group metals (which are typically dispersed on a refractory oxide support) promote the oxidation of nitric oxide (NO) to $NO_2$.

An alternative strategy for the abatement of $NO_x$ under development for mobile applications (including treating exhaust from lean burn engines) uses selective catalytic reduction (SCR) catalyst technology. The strategy has proven effective as applied to stationary sources, e.g., treatment of flue gases. In this strategy, $NO_x$ is reduced with a reductant, e.g., $NH_3$, hydrocarbon, or urea-based reagents, to nitrogen ($N_2$) over an SCR catalyst that is typically composed of base metals. This technology is capable of $NO_x$ reduction greater than 90%, thus it represents one of the best approaches for achieving aggressive $NO_x$ reduction goals.

Particulate matter (PM) is a concern with respect to diesel emissions, as particulates are also connected to respiratory problems. To address both the threat to human health and the need for greater fuel efficiency that diesel engines provide, governmental regulations have been enacted curbing the amount of particulate matter allowed to be emitted from a diesel engine. The two major components of particulate matter are the volatile organic fraction (VOF) and a soot fraction (soot). The VOF condenses on the soot in layers, and is derived from the diesel fuel and oil. The VOF can exist in diesel exhaust either as a vapor or as an aerosol (fine droplets of liquid condensate), depending upon the temperature of the exhaust gas. Soot is predominantly composed of particles of carbon. The particulate matter from diesel exhaust is highly respirable due to its fine particulate size, which poses health risks at higher exposure levels. Moreover, the VOF contains polycyclic aromatic hydrocarbons, some of which are suspected carcinogens.

To satisfy government regulations regarding particulate matter emissions, soot filters have been used. Catalyzed soot filters (CSF), also called diesel particulate filters, are designed to reduce emission of particulate matter from diesel engines. The filters first trap particulates and then use catalytic technology to continuously burn them at normal diesel operating temperatures. When using a CSF, the filter must be periodically regenerated by burning off the particulate matter. However, because the temperature where particulate matter ignites is significantly higher than the normal operating temperature of a diesel engine, catalysts have been used to reduce the ignition temperature of the particulate matter.

The catalysts on the CSF can enhance the oxidation of the particulate matter. Generally, catalysts for CSFs contain alkali or alkaline oxides to reduce the particulate matter ignition temperature. However, these catalysts are often volatile and/or destructive to the filters, resulting in impractically short lifetimes. Additionally, these catalysts require a substantial amount of noble metal catalysts to reduce the HC and CO gases that are emitted along with the particulate matter.

Other oxides, such as rare earth oxides and base metal oxides have also been used in conjunction with noble metal catalysts to attempt to lower the particulate matter ignition temperature while also catalyzing the HC and CO emissions. These catalysts, however, tend to require substantial amounts of noble metal catalysts and/or rare earth oxides. Thus, making these catalysts very expensive to produce.

Unfortunately, as engine modifications are made to diesel engines in order to reduce particulates and unburned hydrocarbons, the $NO_x$ emissions tend to increase.

In a DOC+CSF+SCR catalyst system, both DOC and CSF can make $NO_2$. However, the NO oxidation function on the DOC is less important, and the $NO_2/NO_x$ ratio before the SCR catalyst is controlled by the CSF. Therefore, in such a system, in addition to its soot function (filtration and regeneration), the CSF is also an NO oxidation catalyst, improving the $NO_x$ conversion over the SCR catalyst.

Urea injection is an important element for the SCR technology, particularly reliable and precise control of the injection. Because SCR efficiency is related to $NO_2/NO_x$ ratio, for a given $NO_x$ conversion target, urea injection quantity depends on both $NO_x$ level and $NO_2/NO_x$ ratio. From a control stand point, it is much more desirable to have a constant $NO_2/NOx$ ratio (varying within a narrow range) at the inlet of the SCR catalyst. That requires the NO oxidation activity on the CSF catalyst to be very stable. Existing DOC and CSF catalyst and systems have not been able to meet the NO oxidation stability requirement.

Therefore, there is an ongoing need to develop a catalyzed honeycomb substtrate that provides a stable ratio of $NO_2/NO_x$ for downstream components such as the SCR catalyst.

SUMMARY

Embodiments of the present invention are directed to a catalytic articles for the treatment of lean burn engine exhaust containing a ratio of $NO_2$ to $NO_x$, the catalytic article comprising a honeycomb substrate having disposed thereon a washcoat containing one or more calcined platinum group metal components dispersed on a refractory metal oxide support containing alumina, silica, zirconia, titania, and physical mixtures or chemical combinations thereof, including atomically doped combinations, the platinum group metal components having an average crystallite size in the range of about 10 to about 25 nm to provide a stable ratio of $NO_2$ to $NO_x$ when the exhaust gas flows through the catalyzed honeycomb substrate.

A second aspect of the present invention is directed to a method of treating exhaust gas from a lean burn engine. The method comprises providing a catalytic article in the exhaust gas stream and flowing exhaust gas containing $NO_x$ from a lean burn engine through the catalytic article to provide a ratio of $NO_2/NO_x$ that varies by less than about ±10%, and in specific embodiments less than about ±5% from a target value over the life of the application. In an embodiment of the method, the catalytic article comprises a honeycomb substrate having disposed thereon a washcoat containing one or more platinum group metal components dispersed on an alumina support, the support comprising a refractory metal oxide containing alumina, silica, zirconia, titania, and physical mixtures or chemical combinations thereof, including atomically doped combinations, the platinum group metal having an average crystallite size having a range of about 10 to about 25 nm.

A further aspect of the present invention is directed to a system for the removal of pollutants from a lean burn engine exhaust gas stream containing $NO_x$. The system comprises a catalytic article and a selective catalytic reduction (SCR) catalyst located downstream from the catalytic article. The catalytic article comprises a honeycomb substrate having disposed thereon a washcoat containing one or more platinum group metal components dispersed on an alumina support, the support comprising a refractory metal oxide containing alumina, silica, zirconia, titania, and physical mixtures or chemical combinations thereof, including atomically doped combinations, the platinum group metal component has an average crystallite size having a range of about 10 to about 25 nm to provide a stable ratio of $NO_2$ to $NO_x$ when the exhaust gas flows through the catalytic article.

BRIEF DESCRIPTION OF THE DRAWING

FIG. 1 is a graph showing a correlation between $NO_2/NO_x$ variability (or $\Delta$ ($NO_2/NO_x$)) and average precious metal crystallite size

DETAILED DESCRIPTION

Before describing several exemplary embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

With respect to the terms used in this disclosure, the following definitions are provided.

Reference to a catalytic article including a carrier substrate, for example a honeycomb substrate, having one or more washcoat layers containing a catalytic component, for example, a platinum group metal component that is effective to catalyze the oxidation of HC, CO, and/or $NO_x$.

High surface-area refractory metal oxide supports refer to support particles having pores larger than 20 Å and a wide pore distribution. As defined herein, such metal oxide supports exclude molecular sieves, specifically, zeolites. High surface area refractory metal oxide supports, e.g., silica-alumina support materials, also referred to as "silica-alumina oxides" or by the trade name "Siralox," typically exhibit a BET surface area in excess of 60 square meters per gram ("$m^2/g$"), often up to about 150 $m^2/g$ or higher. Such silica-alumina usually comprises a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina, titania, silica titania, and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Desirably, the active alumina has a specific surface area of 60 to 350 $m^2/g$, and typically 90 to 250 $m^2$ g. The loading on the refractory oxide support is preferably from about 0.1 to about 6 $g/in^3$, more preferably from about 2 to about 5 $g/in^3$ and most preferably from about 2 to about 4 $g/in^3$.

As used herein, molecular sieves, such as zeolites, refer to materials, which may in particulate form support catalytic platinum group metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

Reference to "impregnated" means that a precious metal-containing solution is put into pores of a material such as a zeolite or a non-zeolite-support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the material. Other methods of adding precious metal are also known in the art and can be used.

As used herein, the term "carrier" refers to a support that carries or supports a catalytic species such as a honeycomb substrate.

As used herein, the term "substrate" refers to the monolithic material onto which the carrier is placed, typically in the form of a washcoat containing a plurality of carriers having catalytic species thereon. A washcoat is formed by preparing a slurry containing a specified solids content (e.g., 30-50% by weight) of carriers in a liquid vehicle, which is then coated onto a substrate and dried to provide a washcoat layer.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

Useful high surface area refractory metal oxides include alumina, titania, zirconia and mixtures of alumina with one or more of titania, zirconia, ceria, baria, and a silicate. In specific embodiments, the refractory metal oxide comprises a porous alumina support. Porous alumina support materials include large pore alumina, for example having an average pore radius greater than about 100 angstroms and total pore volume greater than about 0.8 $cm^3/g$. For example, commercially available gamma-alumina can have a pore volume of about 0.5 to >1 $cm^3/g$. It is generally understood that the pores of the alumina define an inner surface (i.e. inner surface of the pores) as well as a total pore volume.

Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina, available from BASF Catalysts LLC (Port Allen, La., USA) and Sasol Germany GmbH (Hamburg, Germany).

Alumina is ubiquitous as supports and/or catalysts for many heterogeneous catalytic processes. Some catalytic processes occur under conditions of high temperature, high pressure and/or high water vapor pressure. The prolonged exposure to high temperature, typically as much as 1000° C. or higher, combined with a significant amount of oxygen and sometimes steam can result in catalyst deactivation by support sintering. In order to prevent this deactivation phenomenon, a stabilizing metal, such as lanthanum, can be added to the alumina support to stabilize the alumina structure.

Alumina, particularly gamma-alumina, can be stabilized by using a small amount of lanthanum oxide, barium oxide, or a combination thereof, typically below 10%, and in most practices between 1-6 wt. %.

As used herein, the term "washcoat" refers to a catalytic layer of material on substrate, such as a honeycomb-type carrier member, which is sufficiently porous to permit the passage therethrough of the gas stream being treated. The catalytic layer is deposited by applying a slurry to the substrate, the slurry being a powder dispersion of the support particles in a liquid medium, typically an aqueous medium.

As used herein, the term "platinum group metal component" refers to any compound, complex, or the like which, upon calcination or use thereof, decomposes or otherwise converts to a catalytically active form, usually the metal or the metal oxide. In specific embodiments, the platinum group metal is in a zero valence state. Typically, when palladium is desired, the palladium component is utilized in the form of a compound or complex to achieve dispersion of the component on the refractory metal oxide support, e.g., silica-alumina. Water-soluble compounds or water-dispersible compounds or complexes of the platinum group metal component may be used as long as the liquid medium used to impregnate or deposit the platinum group metal component onto the refractory metal oxide support particles does not adversely react with the metal or its compound or its complex or other components which may be present in the catalyst composition and is capable of being removed from the platinum group metal component by volatilization or decomposition upon heating and/or application of a vacuum. In some cases, the completion of removal of the liquid may not take place until the catalyst is placed into use and subjected to the high temperatures encountered during operation. Generally, aqueous solutions of soluble compounds or complexes of the precious metals are utilized. For example, suitable compounds are palladium nitrate or tetraammine palladium nitrate or platinum chloroplatinic acid, amine-solubilized platinum hydroxide, etc. During the calcination step, or at least during the initial phase of use of the composite, such compounds are converted into a catalytically active form of the metal or a compound thereof.

As used herein, the term "stable ratio" means the catalytic article is effective to minimize variance in a $NO_2/NO_x$ ratio exiting the honeycomb substrate when lean burn engine exhaust gas is flowed through the honeycomb substrate by less than ±5% from a target value over the life of the application, for example, the life of a vehicle having the catalytic article disposed in the exhaust gas treatment system downstream from the lean burn engine. The stability of a catalyst can be determined by testing samples of a catalyst under simulated conditions in a laboratory or on an engine bench. For example, when tested after stabilizing in exhaust at 600° C. for 1 hour, as compared to when tested after aging in exhaust for 750° C. for 20 hours, 650° C. for 100 hours or 550° C. for 500 hours depending on the vehicle application.

Governmental regulations mandate the use of $NO_x$ reduction technologies for light and heavy-duty vehicles. Euro 6 and US 2010 regulations mandate the use of $NO_x$ reduction technologies for light- and heavy-duty vehicles. Selective catalytic reduction (SCR) of $NO_x$ using urea is an effective and dominant emission control technology for $NO_x$ control. The efficiency of the $NO_x$ reduction, however, depends on the $NO_2/NO_x$ ratio upstream of the SCR catalyst, with 0.5 being the optimal ratio. Too much deviation from this ratio (<0.3 or >0.6) results in lower $NO_x$ conversion.

Reliable and precise control of urea injection is important. Because SCR efficiency is related to $NO_2/NO_x$ ratio, for a given $NO_x$ conversion target, urea injection quantity depends on both $NO_2$ level and $NO_2/NO_x$ ratio. From a control perspective, it is more desirable to have a constant $NO_2/NO_x$ ratio (varying within a narrow range) at the inlet of the SCR catalyst. Providing this variance in a narrow range requires the NO oxidation on the CSF catalyst to be very stable.

This stability requirement (±5% for the life of the catalyst) is a very stringent requirement. Three catalyst conditions were chosen to represent the extreme states a catalyst may encounter during its life: fresh—as prepared; stabilized—calcined at 600° C. for 1 hour; and aged—calcined at 750° C. for 20 hours. A normal CSF catalyst has a wide performance gap between the most active state of the catalyst and the least active state of the catalyst. For example, a CSF with 35 g/ft³ platinum group metal (PGM), Pt/Pd=10/1, shows a performance gap of 0.55 (maximum $NO_2/NO_x$ – minimum $NO_2/NO_x$).

Embodiments of the invention provide catalytic articles for the treatment of lean burn engine exhaust gas. The catalyzed honeycomb substrate contains a ratio of $NO_2$ to $NO_x$. In specific embodiments, the substrate comprises a honeycomb substrate which supports a washcoat containing one or more calcined platinum group metal components dispersed on a refractory metal oxide support. The refractory oxide support can comprise one of alumina, silica, zirconia, titania, and physical mixtures or chemical combinations thereof, including atomically doped combinations. The washcoat is located on the honeycomb substrate and the platinum group metal components have an average crystallite size in the range of about 10 to about 25 nm (in specific embodiments from 10 to 25 nm) to provide a stable ratio of $NO_2$ to $NO_x$ when the exhaust gas flows through the catalyzed honeycomb substrate. In other words, the catalytic article is effective to minimize variance in a $NO_2/NO_x$ ratio exiting the honeycomb substrate when lean burn engine exhaust gas is flowed through the honeycomb substrate by less than ±5% from a target value over the life of the application (vehicle having the catalytic article mounted in the exhaust gas treatment of the vehicle).

As used herein, "stable" with respect to $NO_2/NO_x$ ratio refers to the catalyzed honeycomb substrate being effective to minimize variance in a $NO_2/NO_x$ ratio exiting the honeycomb substrate to within ±5% from a target value during the life of the vehicle having the catalytic article in the exhaust gas treatment system of the vehicle. For example, when tested after stabilizing in exhaust at 600° C. for 1 hour, as compared to when tested after aging in exhaust for 750° C. for 20 hours, 650° C. for 100 hours or 550° C. for 500 hours depending on the vehicle application.

According to one or more embodiments, the platinum group metal is selected from platinum (Pt), palladium (Pd), ruthenium (Ru), rhodium (Rh), osmium (Os), iridium (Ir), and mixtures thereof. In specific embodiments, the platinum group metal comprises a ratio of platinum and palladium. The ratio of platinum and palladium can be equal to or greater than about 2, or equal to or greater than about 5.

In a further embodiment, the platinum group metal component comprises platinum.

In one or more embodiments, the washcoat is disposed on the honeycomb substrate, and the platinum group metal components have an average crystallite size in the range of about 10 to about 25 nm, or about 15 to about 20 nm. As used herein, the term "about" refers to a range that is optionally +/−25%, preferably +/−10%, more preferably, +/−5%, or most preferably +/−1% of the value with which the term is associated. In specific embodiments, the platinum group metal components have an average crystallite size of about 15 to about 20 nm.

In other embodiments, the platinum group metal components have an average crystallite size of 10 to 25 nm, particularly, 15 to 20 nm. In a specific embodiment, the platinum group metal components have an average crystallite size of 15 to 20 nm.

In one or more embodiments, the honeycomb substrate is a flow-through monolith, containing a washcoat of catalytic material such that the catalytic article is a diesel oxidation catalyst (DOC).

According to one or more embodiments, the carrier may be any of those materials typically used for preparing DOC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc.

Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

According to one or more embodiments, the carrier may be any of those materials typically used for preparing catalyzed soot filter (CSF) catalysts. For a catalyzed soot filter, the substrate may be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

Specific wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 50% and have a mean pore size of at least 10 microns. When substrates with these porosities and these mean pore sizes are coated with the techniques described below, adequate levels of the CSF catalyst compositions can be loaded onto the substrates to achieve excellent $NO_x$ conversion efficiency and burning off of soot. These substrates are still able to retain adequate exhaust flow characteristics, i.e., acceptable back pressures, despite the CSF catalyst loading.

An exemplary CSF is made using calcined platinum group metal powder narrowed the performance gap of the catalyzed honeycomb substrate. Platinum group metal-containing powder was calcined at 600-800° C. before making a slurry. The lowest performance gap obtained over a CSF was 0.05. Thus, there is a correlation between catalyst stability (performance gap) and platinum group metal component particle size. An average particle size of between about 10 to about 25 nm, particularly between about 15 and about 20 nm, results in a stable CSF catalyst.

The catalyzed honeycomb substrate can also be used for diesel oxidation catalyst design, for a DOC+SCRoF system, where the $NO_2/NOx$ ratio is realized by the DOC catalyst.

A second aspect of the present invention is directed to a method of treating exhaust gas from a lean burn engine. The method comprises placing the catalytic article described above in the exhaust gas stream, and flowing exhaust gas containing $NO_x$ from a lean burn engine through the catalytic article to provide a ratio of $NO_2/NO_x$ that varies by less than about ±10%, and in more specific embodiments, less than about ±5% from a target value over the life of the application. For example, when tested after stabilizing in exhaust at 600° C. for 1 hour, as compared to when tested after aging in exhaust for 750° C. for 20 hours, 650° C. for 100 hours or 550° C. for 55 hours depending on the vehicle application. The catalytic article comprises a honeycomb substrate having disposed thereon a washcoat containing one or more platinum group metal components dispersed on an alumina support, the support comprising a refractory metal oxide containing alumina, silica, zirconia, titania, and physical mixtures or chemical combinations thereof, including atomically doped combinations. The platinum group metal has an average crystallite size having a range of about 10 to about 25 nm. In specific embodiments, the platinum group metal components have an average crystallite size of about 15 to about 20 nm. In other embodiments, the platinum group metal components have an average crystallite size of 10 to 25 nm, particularly, 15 to 20 nm. In a specific embodiment, the platinum group metal components have an average crystallite size of 15 to 20 nm.

According to one or more embodiments, for the method of treating exhaust gas from a lean burn engine, the target value of $NO_2/NO_x$ is in the range of 0.3 to 0.6. In a specific embodiment, the target value of $NO_2/NO_x$ is about 0.5. The ratio of $NO_2/NO_x$ can be monitored using exhaust gas sensors and an on board computer on the vehicle. The platinum group metal component is selected from platinum (Pt), palladium (Pd), ruthenium (Ru), rhodium (Rh), osmium (Os), iridium (Ir), and mixtures thereof. In specific embodiments, the platinum group metal comprises a ratio of platinum and palladium. The ratio of platinum and palladium can be equal to or greater than about 2, or equal to or greater than about 5. In a specific embodiment, the platinum group metal components comprise platinum.

According to one or more embodiments, for the method of treating exhaust gas from a lean burn engine, the honeycomb substrate can be a flow through diesel oxidation catalyst (DOC). In other embodiments, the honeycomb substrate can be a catalyst soot filter (CSF).

A further aspect of the present invention is directed to system for the removal of pollutants from a lean burn engine exhaust gas stream containing $NO_x$. The system comprises a catalytic article comprising a honeycomb substrate, a washcoat disposed on the substrate, and a selective catalytic reduction catalyst located downstream from the catalyzed honeycomb substrate. The washcoat contains one or more platinum group metal components dispersed on an alumina support, the support comprising a refractory metal oxide containing alumina, silica, zirconia, titania, and physical mixtures or chemical combinations thereof, including atomically doped combinations, wherein the washcoat is located on the honeycomb substrate, and the platinum group metal component has an average crystallite size having a range of about 10 to about 25 nm to provide a stable ratio of $NO_2$ to $NO_x$. The catalyzed honeycomb substrate is effective to minimize variance in a $NO_2/NO_x$ ratio exiting the honeycomb substrate when lean burn engine exhaust gas is flowed through the honeycomb substrate by less than ±5% from a target value over the life of the application. For example, when tested after stabilizing in exhaust at 600° C. for 1 hour, as compared to when tested after aging in exhaust for 750° C. for 20 hours, 650° C. for 100 hours, or 550° C. for 500 hours depending upon the vehicle application.

According to one or more embodiments, the honeycomb substrate of the system has an inlet end and an outlet end, and the washcoat containing the platinum group metal is on the inlet end of the substrate and the selective catalytic reduction (SCR) catalyst is on the outlet end of the substrate. In one or more embodiments, the SCR catalyst and the washcoat containing the platinum group metal can be on separate substrates.

In DOC+CSF+SCR catalyst systems, such as those according to one or more embodiments, both DOC and CSF can make $NO_2$. The NO oxidation function, however, on the DOC is less important, and the $NO_2/NO_x$ ratio upstream of the SCR catalyst is controlled by the CSF. Accordingly, in such a system, in addition to its soot function (filtration and regeneration), CSF is also an NO oxidation catalyst, improving the $NO_x$ conversion over the SCR catalyst.

According to one or more embodiments, the catalyzed honeycomb substrate of the system is a flow through diesel oxidation catalyst (DOC), which is placed upstream of a selective catalytic reduction (SCR) catalyst, and a conventional catalytic soot filter (CSF) is located downstream of the SCR catalyst. The diesel oxidation catalyst can be composed of a layered structure, one layer of which uses the catalyzed honeycomb substrate of the invention, and the other layer of which uses a conventional diesel oxidation catalyst designed for CO and HC oxidation.

According to one or more embodiments, in the system for the removal of pollutants from a lean burn engine exhaust gas stream containing $NO_x$, the catalyzed honeycomb substrate of the invention can be applied to either a diesel oxidation catalyst (DOC), a catalyzed soot filter (CSF), or both, and the DOC and CSF are located in front of the selective catalytic reduction (SCR) catalyst.

According to one or more embodiments, the honeycomb substrate of the system comprises a wall flow monolith placed in front of the selective catalytic reduction (SCR) catalyst without use of a flow-through diesel oxidation catalyst (DOC). The CSF can be coated with a different washcoat in the inlet and outlet, either of which can be formulated with the catalytic honeycomb substrate of the invention.

According to one or more embodiments, the SCR catalyst of the system is on a wall flow substrate, and the washcoat containing the platinum group metal component is on a flow through substrate.

According to one or more embodiments, the platinum group metal component in the system has an average crystallite size of about 15 to about 20 nm. The platinum group metal components is selected from platinum (Pt), palladium (Pd), ruthenium (Ru), rhodium (Rh), osmium (Os), iridium (Ir), and mixtures thereof. In specific embodiments, the platinum group metal comprises a ratio of platinum and palladium. The ratio of platinum and palladium can be equal to or greater than about 2, or equal to or greater than about 5. In a specific embodiment, the platinum group metal components comprise platinum.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Preparation of Catalytic Article

A catalytic article was prepared by placing a washcoat on a honeycomb wall flow substrate ("filter"). The washcoat composition included 42 g/ft³ precious metal with Pt/Pd weight ratio=3:1 and 0.25 g/in³ $SiO_2/Al_2O_3$ (5% $SiO_2$) particulate support. The composition was the same throughout the length of the filter. The filter was made of silicon carbide with a porosity of about 45% of the mean pore size about 15 μm. All catalyst samples were coated on the same type of filter substrate.

To prepare the catalyst coating slurry, a pre-milled $SiO_2$/$Al_2O_3$ powder (90% of the particles are less than 5 micrometers, or D90<5 mm) was suspended in water to reach about 40% solid. A calculated amount of platinum tetra monoethanolamine hydroxide solution was added into the suspension drop-wise while stirring. Then calculated amount of palladium nitrate solution was added in the same manner. The resulting slurry was further diluted with water to achieve about 10% solids by weight.

The slurry was then washcoated by immersing the substrate into the slurry with inlet side of the substrate down and the outlet side just above (about ¼ inch) the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour.

The obtained sample is designated as "fresh sample". After catalytic testing, the fresh sample is further calcined at 600° C. with flowing $O_2/N_2$/steam (10% $O_2$, 10% steam) mixture for 1 hour, which is called "stabilized" sample. After another catalytic testing, the sample is aged at 750° C. with the $O_2/N_2$/steam mixture for 20 hours, and the resulting sample is called "aged" sample. The designations for fresh, stabilized and aged samples are identical for all samples.

Example 2

Example 2 had the following composition: 25 g/ft³ precious metal with Pt/Pd weight ratio=10:1 and 0.3 g/in³ $Al_2O_3$. The alumina powder was impregnated first with calculated amount of platinum tetra monoethanolamine hydroxide solution then with calculated amount of palladium nitrate solution using the incipient wetness technique. The resulting powder was suspended in water to reach about 40% solid content. The slurry was then milled using a continuous mill to obtain 90% of the particles are less than 5 micrometers. The pH during milling was adjusted to 4-5 by adding acetic acid (or nitrate acid). The resulting slurry was further diluted with water to achieve about 15% solids by weight. The slurry was then washcoated onto the SiC substrate in the same way as Sample 1. The coated sample was then dried at 110° C. for 2 hours and calcined in air at 450° C. for 1 hour.

Example 3

Example 3 had the following composition: 25 g/ft³ precious metal with Pt/Pd weight ratio=10:1 and 0.3 g/in³ $Al_2O_3$. The alumina powder was impregnated first with calculated amount of platinum tetra monoethanolamine hydroxide solution then with calculated amount of palladium nitrate solution using the incipient wetness technique. The resulting powder was dried at 110° C. for 2 hours and then calcined at 450° C. in air for 2 hours. The average crystallite size of precious metal, measured using CO Chemisorption, is 2.5 nanometers. The calcined powder was then suspended in water to reach about 40% solid content and milled using a continuous mill to obtain 90% of the particles are less than 5 micrometers. The pH during milling was adjusted to 4-5 by adding acetic acid (or nitrate acid). The resulting slurry was further diluted with water to achieve about 15% solids by weight. The resulting slurry was washcoated onto the SiC substrate in the same way as Sample 1. The coated sample was then dried at 110° C. for 2 hours and calcined in air at 450° C. for 1 hour.

Example 4

Example 4 had the following composition: 25 g/ft³ precious metal with Pt/Pd weight ratio=10:1 and 0.3 g/in³ $Al_2O_3$. The alumina powder was impregnated first with calculated amount of platinum tetra monoethanolamine hydroxide solution then with calculated amount of palladium nitrate solution using the incipient wetness technique. The resulting powder was dried at 110° C. for 2 hours and then was calcined at 600° C. in air for 2 hours. The average crystallite size of precious metal, measured using CO Chemisorption, is 6.9 nanometers. The calcined powder was then suspended in water to reach about 40% solid content and milled using a continuous mill to obtain 90% of the particles are less than 5 micrometers. The pH during milling was adjusted to 4-5 by adding acetic acid (or nitrate acid). The resulting slurry was further diluted with water to achieve about 15% solids by weight. The resulting slurry was washcoated onto the SiC substrate in the same way as Sample 1. The coated sample was then dried at 110° C. for 2 hours and calcined in air at 450° C. for 1 hour.

Example 5

Example 5 had the following composition: 25 g/ft$^3$ precious metal with Pt/Pd weight ratio=10:1 and 0.3 g/in$^3$ Al$_2$O$_3$. The alumina powder was impregnated first with calculated amount of platinum tetra monoethanolamine hydroxide solution then with calculated amount of palladium nitrate solution using the incipient wetness technique. The resulting powder was dried at 110° C. for 2 hours and then was calcined at 700° C. in air for 2 hours. The average crystallite size of precious metal, measured using CO Chemisorption, is 10.7 nanometers. The calcined powder was then suspended in water to reach about 40% solid content and milled using a continuous mill to obtain 90% of the particles are less than 5 micrometers. The pH during milling was adjusted to 4-5 by adding acetic acid (or nitrate acid). The resulting slurry was further diluted with water to achieve about 15% solids by weight. The resulting slurry was washcoated onto the SiC substrate in the same way as Example 1. The coated sample was then dried at 110° C. for 2 hours and calcined in air at 450° C. for 1 hour.

Example 6

Example 6 had the following composition: 25 g/ft$^3$ precious metal with Pt/Pd weight ratio=10:1 and 0.3 g/in$^3$ Al$_2$O$_3$. The alumina powder was impregnated first with calculated amount of platinum tetra monoethanolamine hydroxide solution then with calculated amount of palladium nitrate solution using the incipient wetness technique. The resulting powder was dried at 110° C. for 2 hours and then was calcined at 800° C. in air for 2 hours. The average crystallite size of precious metal, measured using CO Chemisorption, is 16.7 nanometers. The calcined powder was then suspended in water to reach about 40% solid content and milled using a continuous mill to obtain 90% of the particles are less than 5 micrometers. The pH during milling was adjusted to 4-5 by adding acetic acid (or nitrate acid). The resulting slurry was further diluted with water to achieve about 15% solids by weight. The resulting slurry was washcoated onto the SiC substrate in the same way as Example 1. The coated sample was then dried at 110° C. for 2 hours and calcined in air at 450° C. for 1 hour.

Example 7

Example 7 had the following composition: 36 g/ft$^3$ precious metal with Pt/Pd weight ratio=10:1 and 0.4 g/in$^3$ SiO$_2$Al$_2$O$_3$ (1.5% SiO$_2$). The silica/alumina powder (1.5% SiO$_2$) was impregnated first with calculated amount of platinum tetra monoethanolamine hydroxide solution then with calculated amount of palladium nitrate solution using the incipient wetness technique. The powder was flash calcined in a fluidized bed for a short period (1-5 seconds). The resulting powder has a precious metal composition of 4.95% by weight. [This powder was used for Examples 7-10.] The flash calcined powder was further calcined in oven at 800° C. in air for 2 hours. The calcined powder was then suspended in water to reach about 40% solid content and milled using a continuous mill to obtain 90% of the particles are less than 5 micrometers. The pH during milling was adjusted to 4-5 by adding acetic acid (or nitrate acid). The resulting slurry was further diluted with water to achieve about 15% solids by weight. The resulting slurry was washcoated onto the SiC substrate in the same way as Example 1. The coated sample was then dried at 110° C. for 2 hours and calcined in air at 450° C. for 1 hour.

Example 8

Example 8 had the following composition: 27 g/ft$^3$ precious metal with Pt/Pd weight ratio=10:1 and 0.3 g/in$^3$ SiO$_2$Al$_2$O$_3$ (1.5% SiO$_2$). The silica/alumina powder (1.5% SiO$_2$) was impregnated first with calculated amount of platinum tetra monoethanolamine hydroxide solution then with calculated amount of palladium nitrate solution using the incipient wetness technique. The powder was flash calcined in a fluidized bed for a short period (1-5 seconds). The resulting powder has a precious metal composition of 4.95% by weight. The flash calcined powder was further calcined in oven at 800° C. in air for 2 hours. The calcined powder was then suspended in water to reach about 40% solid content and milled using a continuous mill to obtain 90% of the particles are less than 5 micrometers. No acid was added during milling, and the pH during milling was near 7. The resulting slurry was further diluted with water to achieve about 12% solids by weight. The resulting slurry was washcoated onto the SiC substrate in the same way as Example 1. The coated sample was then dried at 110° C. for 2 hours and calcined in air at 450° C. for 1 hour.

Example 9

Example 9 had the following composition: 21.6 g/ft$^3$ precious metal with Pt/Pd weight ratio=10:1 and 0.24 g/in$^3$ SiO$_2$Al$_2$O$_3$ (1.5% SiO$_2$). The silica/alumina powder (1.5% SiO$_2$) was impregnated first with calculated amount of platinum tetra monoethanolamine hydroxide solution then with calculated amount of palladium nitrate solution using the incipient wetness technique. The powder was flash calcined in a fluidized bed for a short period (1-5 seconds). The resulting powder has a precious metal composition of 4.95% by weight. The flash calcined powder was further calcined in oven at 800° C. in air for 2 hours. The calcined powder was then suspended in water to reach about 40% solid content and milled using a continuous mill to obtain 90% of the particles are less than 5 micrometers. No acid was added during milling, and the pH during milling was near 7. The resulting slurry was further diluted with water to achieve about 10% solids by weight. The resulting slurry was washcoated onto the SiC substrate in the same way as Example 1. The coated sample was then dried at 110° C. for 2 hours and calcined in air at 450° C. for 1 hour.

Example 10

Example 10 had the following composition: 14.4 g/ft$^3$ precious metal with Pt/Pd weight ratio=10:1 and 0.16 g/in$^3$ SiO$_2$Al$_2$O$_3$ (1.5% SiO$_2$). The silica/alumina powder (1.5% SiO$_2$) was impregnated first with calculated amount of platinum tetra monoethanolamine hydroxide solution then with calculated amount of palladium nitrate solution using the incipient wetness technique. The powder was flash calcined in a fluidized bed for a short period (1-5 seconds). The resulting powder has a precious metal composition of 4.95% by weight. The flash calcined powder was further calcined in oven at 800° C. in air for 2 hours. The calcined powder was then suspended in water to reach about 40% solid content and milled using a continuous mill to obtain 90% of the particles are less than 5 micrometers. No acid was added during milling, and the pH during milling was near 7. The resulting slurry was further diluted with water to achieve about 4% solids by weight. The resulting slurry was washcoated onto the SiC substrate in the same way as Example 1. The coated sample was then dried at 110° C. for 2 hours and calcined in air at 450° C. for 1 hour.

Example 11 Catalyst Testing and Results

Test Conditions

The tests were conducted in a laboratory reactor which is capable of flowing 150 liter of gas per minute. The sample, 34 mm×34 mm×150 mm SiC segment was housed in the center of a heater sample holder. The targeted temperature of the CSF inlet was achieved partially from the preheated gas via a massive preheater and partially by the heated sample holder itself. The feed consists of 75 ppm HC (15 ppm $C_3H_6$, 60 ppm $C_{10}H_{22}$ on C1 basis), 100 ppm NO, 7% $H_2O$, 10% $O_2$, balance $N_2$. The gas hourly space velocity was 35,000/h. CSF was tested as fresh, stabilized and aged samples. Fresh means as prepared; stabilized means that the sample was calcined at 600° C. with flowing $O_2/N_2$/steam (10% $O_2$, 10% steam) mixture for 1 hour; aged means that the sample is calcined at 750° C. with the $O_2/N_2$/steam mixture for 20 hours.

Test Results

TABLE 1

Effect of powder calcination temperature on $NO_2/NO_x$ variability at 300° C.

| Sample | $NO_2/NO_x$ Fresh | $NO_2/NO_x$ Stabilized | $NO_2/NO_x$ Aged | $\Delta(NO_2/NO_x)$ = Stabilized-aged | Relative PGM cost (%) | Ave. PGM crystallite size, nm |
|---|---|---|---|---|---|---|
| 1 | 0.27 | 0.74 | 0.33 | 0.41 | 100 | N/A |
| 2 | 0.41 | 0.76 | 0.37 | 0.39 | 66 | N/A |
| 3 | 0.72 | 0.83 | 0.48 | 0.35 | 66 | 2.5 |
| 4 | 0.66 | 0.81 | 0.49 | 0.32 | 66 | 6.9 |
| 5 | 0.52 | 0.6 | 0.49 | 0.11 | 66 | 10.7 |
| 6 | 0.4 | 0.51 | 0.46 | 0.05 | 66 | 16.9 |

PGM Price [$/ozt] is based on Rona October 2012 Pt = 1800 USD, Pd = 750 USD

FIG. 1 shows the correlation between $NO_2/NO_x$ variability (or $\Delta(NO_2/NO_x)$) and average precious metal crystallite size

TABLE 2 shows the effect of powder calcination temperature and PGM loading on $NO_2/NO_x$ variability at 300° C.

| Sample | $NO_2/NO_x$ Fresh | $NO_2/NO_x$ Stabilized | $NO_2/NO_x$ Aged | $\Delta(NO_2/NO_x)$ = Stabilized-aged | Relative PGM cost (%) |
|---|---|---|---|---|---|
| 1 | 0.27 | 0.74 | 0.33 | 0.41 | 100 |
| 7 | 0.48 | 0.70 | 0.55 | 0.15 | 95 |
| 8 | 0.61 | 0.67 | 0.56 | 0.12 | 71 |
| 9 | 0.52 | 0.62 | 0.50 | 0.12 | 57 |
| 10 | 0.50 | 0.58 | 0.44 | 0.14 | 38 |

PGM price [$/ozt] is based on Rona October 2012 Pt = 1800 USD, Pd = 750

The data in Table 1 show that increasing the Pt/Pd ratio from 3:1 to 10:1, while reducing the PGM loading from 42 g/ft³ to 25 g/ft³ (Sample 1 vs. Sample 2), significantly increases the fresh $NO_2/NO_x$ ratio at 300° C. with comparable $NO_2/NO_x$ ratios for the stabilized and aged catalyst. Therefore, $\Delta(NO_2/NO_x)$, defined as stabilized $NO_2/NO_x$–aged $NO_2/NO_x$, is basically the same. By calcining the PGM/support powder at increasing temperature (450, 600, 700, 800° C. for Samples 3 to 6, respectively) before slurry preparation, we can see a series of changes in $NO_2/NO_x$ ratio. Both fresh and stabilized $NO_2/NO_x$ ratios moderately decrease with increasing calcination temperature, while the aged $NO_2/NO_x$ ratio increases due to calcination but is constant with respect to calcination temperature. As a consequence, the variability, $\Delta(NO_2/NO_x)$, decreases with powder calcination temperature. As also shown in Table 1, the crystallite size of PGM increases with powder calcination temperature. The enlarged crystal sizes may be the reason why CSF samples with calcined powder are more stable for $NO_2$ formation. In fact, we can clearly see this correlation between $NO_2$ stability and crystallite size in FIG. 1. Table 2 shows that even with lower PGM loading CSF samples made with calcined powder (Samples 8 to 10) show superior performance in $NO_2$ formation compared to the reference sample (Sample 1); the variability ($\Delta(NO_2/NO_x)$) is lower, and the aged $NO_2/NO_x$ is higher.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed. Thus, it is intended that the present invention include modifications and variations that are within the scope of the appended claims and their equivalents.

What is claimed is:

1. A catalytic article for the treatment of lean burn engine exhaust gas containing a ratio of $NO_2$ to $NO_x$, the catalytic article comprising:
   a honeycomb substrate having disposed thereon a washcoat containing one or more calcined platinum group metal components dispersed on a refractory metal oxide support containing alumina, silica, zirconia, titania, and physical mixtures or chemical combinations thereof, including atomically doped combinations, the washcoat disposed on the honeycomb substrate, and the platinum group metal components have an average crystallite size in the range of about 15 to about 20 nm to provide a stable ratio of $NO_2$ to $NO_x$ when the exhaust gas flows through the catalyzed honeycomb substrate.

2. The catalytic article of claim 1, wherein the honeycomb substrate is a flow-through monolith.

3. The catalytic article of claim 1, wherein the honeycomb substrate is a wall flow monolith.

4. The catalytic article of claim 1, wherein the platinum group metal components comprise Pt.

5. The catalytic article of claim 1, wherein the platinum group metal components comprise Pt and Pd.

6. The catalytic article of claim 5, wherein the Pt and Pd are present in a ratio that is equal or greater than about 2.

7. The catalytic article of claim 6, wherein the ratio of Pt and Pd is equal to or greater than about 5.

8. A method of treating exhaust gas from a lean burn engine, the method comprising:
providing a catalytic article comprising honeycomb substrate having disposed thereon a washcoat containing one or more platinum group metal components dispersed on an alumina support, the support comprising a refractory metal oxide containing alumina, silica, zirconia, titania, and physical mixtures or chemical combinations thereof, including atomically doped combinations, the platinum group metal having an average crystallite size in a range of about 15 to about 20 nm; and
flowing exhaust gas containing $NO_x$ from a lean burn engine through the catalytic article to provide a ratio of $NO_2/NO_x$ that varies by less than about ±10% from a target value after aging of the catalyzed honeycomb substrate in a simulated exhaust gas environment at 750° C. for 20 hours.

9. The method of claim 8, wherein the target value of $NO_2/NO_x$ is in the range of 0.3 to 0.6.

10. The method of claim 8, wherein the platinum group metal components comprise Pt.

11. The method of claim 8, wherein the platinum group metal components comprise Pt and Pd.

12. The method of claim 11, wherein the Pt and Pd are present in a ratio of greater than or equal to about 2.

13. The method of claim 12, wherein the ratio of Pt and Pd is greater than or equal to about 5.

14. The method of claim 8, wherein the honeycomb substrate is a flow though substrate.

15. The method of claim 8, wherein the honeycomb substrate is a wall flow monolith.

16. A system for the removal of pollutants from lean burn engine exhaust gas stream containing $NO_x$, the system comprising:
a honeycomb substrate having disposed thereon a washcoat containing one or more platinum group metal components dispersed on an alumina support, the support comprising a refractory metal oxide containing alumina, silica, zirconia, titania, and physical mixtures or chemical combinations thereof, including atomically doped combinations, wherein the washcoat is located on the honeycomb substrate, and the platinum group metal component has an average crystallite size in a range of about 10 to about 25 nm to provide a stable ratio of $NO_2$ to $NO_x$ when the exhaust gas flows through the honeycomb substrate; and
a selective catalytic reduction (SCR) catalyst located downstream from the catalyzed honeycomb substrate.

17. The system of claim 16, wherein the honeycomb substrate has an inlet end and an outlet end, and the washcoat containing one or more platinum group metal components is on the inlet end of the substrate and the SCR catalyst is on the outlet end of the substrate.

18. The system of claim 16, wherein the SCR catalyst and the washcoat containing one or more platinum group metal components are on separate substrates.

19. The system of claim 16 wherein the honeycomb substrate is a flow through substrate placed upstream of the SCR catalyst, with a catalyzed soot filter located downstream of the SCR catalyst.

20. The system of claim 19 wherein the honeycomb substrate carries two layers, one layer comprising the washcoat containing one or more platinum group metal components and the other layer of which uses a DOC designed for CO and HC oxidation.

21. The system of claim 16 wherein a diesel oxidation catalyst and catalyzed soot filter are upstream of the SCR catalyst and the washcoat containing one or more platinum group metal components is also on at least one of the diesel oxidation catalyst and the catalyzed soot filter.

22. The system of claim 16, wherein the honeycomb substrate comprises a wall flow monolith placed in front of the SCR catalyst without use of a flow-through diesel oxidation catalyst.

23. The system of claim 22 wherein the wall flow monolith has an inlet end and outlet end and is coated with a different washcoat at the inlet and outlet ends, one of which is coated with the washcoat containing one or more platinum group metal components.

24. The system of claim 16, wherein the SCR catalyst is on a wall flow monolith and the catalyzed honeycomb substrate is a flow through substrate.

25. The system of claim 16, wherein the platinum group metal component has an average crystallite size of about 15 to about 20 nm.

26. The system of claim 16, wherein the platinum group metal components comprise Pt.

27. The system of claim 16, wherein the platinum group metal components comprise Pt and Pd.

28. The system of claim 27, wherein the Pt and Pd are present in a ratio of greater than or equal to about 2.

29. The system of claim 28, wherein the ratio of Pt and Pd is greater than or equal to about 5.

* * * * *